(12) United States Patent
Ha et al.

(10) Patent No.: US 9,012,352 B2
(45) Date of Patent: Apr. 21, 2015

(54) CATALYST FOR FISCHER-TROPSCH SYNTHESIS HAVING EXCELLENT HEAT TRANSFER CAPABILITY

(75) Inventors: Kyoung Su Ha, Daejeon (KR); Joo Young Cheon, Gyeonggi-do (KR); Yun Jo Lee, Daejeon (KR); Seung-Chan Baek, Daejeon (KR); Geun Jae Kwak, Daejeon (KR); Seon Ju Park, Daejeon (KR); Ki Won Jun, Daejeon (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 0 days.

(21) Appl. No.: 14/111,658

(22) PCT Filed: Apr. 25, 2012

(86) PCT No.: PCT/KR2012/003184
§ 371 (c)(1),
(2), (4) Date: Oct. 14, 2013

(87) PCT Pub. No.: WO2012/148165
PCT Pub. Date: Nov. 1, 2012

(65) Prior Publication Data
US 2014/0038813 A1 Feb. 6, 2014

(30) Foreign Application Priority Data
Apr. 26, 2011 (KR) .......................... 10-2011-0038819

(51) Int. Cl.
*B01J 27/224* (2006.01)
*B01J 21/00* (2006.01)
(Continued)

(52) U.S. Cl.
CPC .............. *B01J 23/8913* (2013.01); *B01J 23/40* (2013.01); *B01J 23/70* (2013.01); *B01J 23/89* (2013.01);
(Continued)

(58) Field of Classification Search
USPC ......... 502/178, 240, 242, 258–263, 300, 326, 502/327, 332–339, 349–351, 355, 407, 415, 502/439
See application file for complete search history.

(56) References Cited

U.S. PATENT DOCUMENTS 4,075,231 A 2/1978 Dolhyj et al.
4,992,406 A 2/1991 Mauldin et al.
(Continued)

FOREIGN PATENT DOCUMENTS

KR 20070010190 A 1/2007
KR 20090037089 A 4/2009
WO 2011016759 A1 2/2011

OTHER PUBLICATIONS

International Search Report mailed Sep. 28, 2012; PCT/KR2012/003184.
(Continued)

*Primary Examiner* — Cam N. Nguyen
(74) *Attorney, Agent, or Firm* — Ladas & Parry LLP

(57) ABSTRACT

The present invention relates to a catalyst for Fischer-Tropsch synthesis which has excellent heat transfer capability. This catalyst contains (1) central core particle or particles made of a heat transfer material (HTM) selected from the group consisting of a metal, a metal oxide, a ceramic, and a mixture thereof; and (2) outer particle layer which surrounds the central core particles and is attached to the surfaces of the central core particles by a binder material layer. The outer particle layer has a support and catalyst particles in a powder form containing metal particles disposed on the support. The catalyst having such a dual particle structure shows excellent heat transfer capability and, thus, exhibits high selectivity to a target hydrocarbon. Therefore, the catalyst of the present invention is useful in a fixed-bed reactor for Fischer-Tropsch synthesis for producing hydrocarbons from synthetic gas.

8 Claims, 2 Drawing Sheets

(51) Int. Cl.

| | | |
|---|---|---|
| *B01J 21/04* | (2006.01) | |
| *B01J 20/00* | (2006.01) | |
| *B01J 23/00* | (2006.01) | |
| *B01J 23/02* | (2006.01) | |
| *B01J 23/08* | (2006.01) | |
| *B01J 23/40* | (2006.01) | |
| *B01J 23/42* | (2006.01) | |
| *B01J 23/44* | (2006.01) | |
| *B01J 23/56* | (2006.01) | |
| *B01J 23/70* | (2006.01) | |
| *B01J 23/74* | (2006.01) | |
| *B01J 23/89* | (2006.01) | |
| *B01J 37/02* | (2006.01) | |
| *C10G 2/00* | (2006.01) | |

(52) U.S. Cl.
CPC .......... *B01J 37/0221* (2013.01); *B01J 37/0244* (2013.01); *C10G 2/33* (2013.01); *C10G 2/34* (2013.01); *B01J 37/0248* (2013.01); *B01J 21/04* (2013.01); *C10G 2/331* (2013.01)

(56) References Cited

U.S. PATENT DOCUMENTS

| | | | |
|---|---|---|---|
| 5,200,382 A * | 4/1993 | Cody et al. ............... | 502/204 |
| 5,516,740 A * | 5/1996 | Cody et al. ............... | 502/204 |
| 6,372,685 B1 * | 4/2002 | Pecoraro et al. ........... | 502/232 |
| 7,087,191 B2 * | 8/2006 | Van Hardeveld et al. ..... | 252/373 |
| 7,288,182 B1 * | 10/2007 | Soled et al. ............... | 208/112 |
| 7,361,626 B2 * | 4/2008 | Baijense et al. ........... | 502/329 |
| 7,422,995 B2 * | 9/2008 | Baijense et al. ........... | 502/329 |
| 7,534,737 B2 * | 5/2009 | Gajda ........................ | 502/60 |
| 7,846,977 B2 * | 12/2010 | Baijense et al. ........... | 518/700 |
| 2003/0181535 A1 * | 9/2003 | Van Hardeveld et al. ..... | 518/715 |
| 2004/0251001 A1 | 12/2004 | Maude | |
| 2005/0040090 A1 | 2/2005 | Wang et al. | |
| 2007/0232482 A1 | 10/2007 | Bowe et al. | |
| 2008/0287556 A1 | 11/2008 | Bellussi et al. | |
| 2009/0048353 A1 | 2/2009 | Baijense et al. | |
| 2009/0325791 A1 * | 12/2009 | Pan et al. ................. | 502/242 |
| 2011/0129763 A1 * | 6/2011 | Lee et al. ................. | 429/532 |
| 2013/0112605 A1 * | 5/2013 | Wyndham et al. .......... | 210/198.3 |
| 2013/0172177 A1 * | 7/2013 | Domke et al. ............. | 502/242 |
| 2013/0177838 A1 * | 7/2013 | Wang et al. ............... | 429/524 |

OTHER PUBLICATIONS

First Chinese Office Action Appln. No. 201280019333.8; Issued Sep. 1, 2014.

Extended European Search Report Appln. No. EP 12 77 7039; Issued Oct. 8, 2014.

* cited by examiner

CATALYST FOR FISCHER-TROPSCH SYNTHESIS HAVING EXCELLENT HEAT TRANSFER CAPABILITY

FIELD OF THE INVENTION

The present invention relates to a catalyst for the Fischer-Tropsch synthesis which has excellent heat transfer capability for producing hydrocarbons from synthetic gas.

BACKGROUND OF THE INVENTION

The Fischer-Tropsch process (F-T synthesis) was first developed by German chemists Franz Fischer and Hans Tropsch in 1923, and this process allowed the production of liquid hydrocarbons via synthetic a gas from coal, natural gas, biomass and the like. The process of producing liquid fuels from coal is referred to as "coal-to-liquids (CTL) process"; the process of producing liquid fuels from a natural gas is referred to as "gas-to-liquids (GTL) process"; the process of producing liquid fuels from a biomass is referred to as "biomass-to-liquids (BTL) process"; and recently, the term "XTL" ("X" resource-to-liquids) is often used as a collective name for the similar processes.

These processes first convert each raw material such as coal, a natural gas, a biomass and the like into a synthetic gas through gasification, reforming and etc.; in order to produce liquid fuels, the composition of a synthetic gas suitable for a XTL process is preferably hydrogen:carbon monoxide=2:1, as shown in Reaction Formula I below, wherein CO, $H_2$, —[$CH_2$]—$_n$, and $H_2O$ represent carbon monoxide, hydrogen, hydrocarbon having a chain length of n (n means the number of carbon), and water, respectively.

$$CO+2H_2+-[CH_2]-_n \rightarrow -[CH_2]-_{n+1}+H_2O \quad \text{Reaction Formula I}$$

When the ratio of hydrogen exceeds 2, this increases the methane selectivity and relatively suppresses the selectivity of $C_{5+}$ (a hydrocarbon having carbon atoms of five or more), and therefore it is undesirable. Besides the linear chain hydrocarbons by Reaction Formula I, other byproducts can be produced such as olefins, oxygenates (molecules containing oxygen atom including alcohols, aldehydes, ketones, etc.) and the like.

One of the main purposes of the XTL, process is to obtain liquid fuels, and thus the current trend is to optimize catalytic reaction, ratio of synthetic gas, temperature, pressure, etc. to increase linear chain hydrocarbon selectivity, more particularly $C_{5+}$ selectivity. In the catalytic reaction, a cobalt or iron based catalyst is often used, and these metal catalysts are uniformly dispersed or deposited on a support such as alumina, silica, titania and the like. Precious metals such as ruthenium, platinum, rhenium, etc. may be used as a co-catalyst to improve catalytic performance.

Meanwhile, various types of reactors can be used for the F-T synthesis, e.g., a tubular fixed bed reactor, a fluidized bed reactor, a slurry phase reactor, and a micro-channel reactor or a multi-channel reactor equipped with a heat exchanger. However, the response characteristics and the distribution of the final products may vary with the types of reactor employed, and therefore a suitable reactor should be selected depending on the final target product. A tubular fixed bed reactor, a fluidized bed reactor and a slurry phase reactor take up too much space in view of their outputs. Thus, a multi-channel reactor (covering "micro-channel reactor") taking up a relatively small space (⅕ to ½ size of other types of reactors) for its output is recently more preferred. A multi-channel reactor is designed to maximize heat transfer efficiency so as to make it possible to run reactions at a high space velocity, and its advantages include relatively low cost of equipment and installation, convenience of easy scale-up owing to the ability to adjust systems to any desired capacity, and also mechanical loss due to friction or collision as well as loss due to changes in the reactor behavior or shaking of the catalyst, which may be caused when the equipment moves, are insignificant.

A multi-channel reactor has an alternating layered structure of catalytic beds and heat exchangers, and for the F-T synthesis, a catalyst may be loaded into the reactor by inserting the catalyst inside the reactor (i.e., a fixed-bed reactor) or attached onto the reactor by coating the catalyst on the inner wall of the reactor. In the case of coating the catalyst on the inner wall of the reactor, the loading capacity (i.e., the amount of catalyst which can be loaded in the reactor) is rather small, and thus there is a limitation on the production amount and it is very difficult or nearly impossible to replace the catalyst. Therefore, a fixed-bed reactor, which loads catalyst particles, is more preferred. In case of the fixed-bed reactor, the loading capacity of the catalyst is high and it is relatively easy to replace the catalyst. However, the heat transfer efficiency of this type of reactor is poor, and it also suffers from the formation of hot spots or run-away which makes the reaction uncontrollable.

It is very important to immediately remove the heat of reaction from the catalyst particles during the F-T synthesis because trapping of the heat of reaction may decrease the selectivity of the target hydrocarbon and causes deterioration of the catalyst. Accordingly, attempts have been made to overcome such problems by preparing a fixed-bed catalyst layer using a certain amount of an inert support (see U.S. Pat. No. 4,075,231) or mixing inert particles with the catalytic particles to form catalyst layers to properly control the reaction in conventional methods. However, in the case of using the inert support, the inert support itself is a porous material so the catalytic material soaks into the support and the catalytic reaction also takes place within the support, which makes it very difficult to control the exothermic reaction. In case of physically mixing inert particles with the catalytic particles, it is difficult to uniformly mix these particles, which causes aggregation of the catalytic material, hence preventing a uniform catalytic reaction.

Accordingly, for the synthesis extensive research has been conducted for a catalyst which has good heat transfer capability to redress such problems associated with controlling the reaction heat as well as to improve productivity. For example, U.S. Pat. Application Publication No. 2004/0251001 discloses a thin foil-type catalyst for the F-T synthesis, and KR Laid-Open Patent Publication No. 2007-0010190 discloses a catalyst having an oxidative core material, a zinc oxide shell and a catalytically active material (wherein the base material contains one or more elements selected from the group consisting of cobalt, iron, ruthenium and nickel) which is supported or coated on the shell.

Nevertheless, these conventional catalysts for the F-T synthesis failed to obtain desirable physical properties in terms of heat transfer performance.

SUMMARY OF THE INVENTION

Accordingly, it is an objective of the present invention to provide a catalyst for the Fischer-Tropsch synthesis which has excellent heat transfer capability for producing hydrocarbons from a synthetic gas so as to improve heat transfer performance of a multi-channel fixed-bed reactor.

In accordance with one aspect of the present invention, there is provided a catalyst having a dual particle structure comprising:

(1) central core particle or particles made of a heat transfer material (HTM) selected from the group consisting of a metal, a metal oxide, a ceramic and a mixture thereof; and (2) outer particle layer which surrounds the central core particle or particles and is attached to the surfaces of the central core particle or particles by a binder material layer, and the outer particle layer comprises a support, and catalyst particles in a powder form comprising metal particles disposed on the support.

The catalyst having the dual particle structure in accordance with the present invention has excellent heat transfer capability allowing high selectivity to a target hydrocarbon, particularly to $C_{5+}$ (a hydrocarbon having carbon atoms of five or more) selectivity, and hence is useful in the Fischer-Tropsch synthesis for producing hydrocarbons from a synthetic gas. The catalyst of the present invention is also effectively used as a catalyst in a regular fixed bed reactor (a shell and tube heat exchanger) as well as in a multi-channel reactor where reactions take place at a high space velocity.

DETAILED DESCRIPTION OF THE INVENTION

Figure 1:
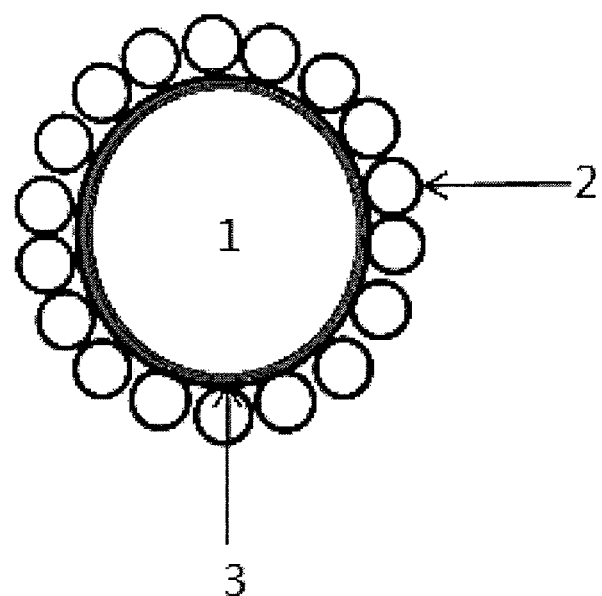
FIG. 1 is a schematic view illustrating a catalyst having a dual particle structure in accordance with the present invention (1: central core particle made of the HTM, 2: outer particle layer made of catalyst particles in a powder form, 3: a binder material layer).

A catalyst having the dual particle structure in accordance with the present invention contains (1) central core particle or particles made of a heat transfer material (HTM) selected from the group consisting of a metal, a metal oxide, a ceramic and a mixture thereof; and (2) outer particle layer which surrounds the central core particles and is attached to the surfaces of the central core particles by a binder material layer. The outer particle layer contains a support and catalyst particles in a powder form having metal particles disposed on the support. The term "dual particle structure," as used herein, refers to a combined structure of the central core particles and the outer particle layer. A catalyst having the dual particle structure for heat exchanger in accordance with the present invention is illustrated in FIG. 1 (1: central core particles made of the HTM, 2: outer particle layer made of catalyst particles in a powder form, 3: a binder material layer).

The central core particles of the catalyst in accordance with the present invention are made of the HTM selected from the group consisting of a metal, a metal oxide, a ceramic and a mixture thereof. Specific examples of the HTM include silicon carbide (SiC), alumina, alundum, silica, aluminum, stainless steel, copper and a mixture thereof. In order to be loaded into the fixed-bed of a reactor, the size of the central core particle is preferably about 0.5 to 20 mm. However, the size may be adjusted if necessary. Also, any suitable shape may be used for the particles, and the particles may have irregular shape. Examples of the shape of the particles include a spheroid, a polyhedron, a hollow cylinder, a Raschig ring and a pall ring.

The outer particle layer of the catalyst in accordance with the present invention contains a support and catalyst particles in a powder form which contain metal particles disposed on the support. The support may be made of alumina, silica, zirconia, titania or a mixture thereof. The metal particles may be Co, Fe, Ru, Re, Rh, Ni, Pd, Pt, Os, Ir, an alloy thereof or a mixture thereof. The size of the support is preferably in the range of from about 10 to 200 μm. The support and the catalyst particles in the powder form which contain metal particles supported therein may be prepared by conventional methods.

A catalyst in accordance with the present invention contains a binder material layer to bind the central core particles to the outer particle layer which surrounds the central core particles. The binder material layer is preferably made of a ceramic material such as silica, boehmite and a mixture thereof, or an oxide containing Si, Al or a mixture thereof and oxygen.

When the binder material layer is made of a ceramic material, a ceramic sol such as a silica sol, a boehmite sol and a mixture thereof is coated on the surfaces of the central core particles, the catalyst particles in the powder form are attached to the ceramic material-coated central core particles, and then the resulting material is sintered at a temperature in the range of from 400 to 500° C. for 1 to 4 hours to form the binder material layer. The sintered binder material layer thus formed completely binds the central core particles to the outer particle layer comprising catalyst particles in the powder form. For example, catalyst particles in the powder form are placed on a plate, etc., added with a suitable amount of the ceramic material-coated central core particles, and then the catalyst particles in the powder form can bind to an adhesive surface of the ceramic sol-coated central core particles by using a suitable method, e.g., moving or shaking the plate.

The catalyst having the dual particle structure thus obtained contains the HTM as a central core particle, which has excellent heat transfer capability, without any catalytic material therein. Thus, the reaction heat may be rapidly diffused rather than being trapped inside the catalyst which prevents deterioration of the catalyst due to heat, and it also reduces the problem of a decrease in selectivity to a target hydrocarbon at a high temperature. The catalyst for the F-T synthesis disclosed in KR Laid-Open Patent Publication No. 2007-0010190 is a core-shell type catalyst having an oxidative core material, a zinc oxide shell and a catalytically active material that is supported in or coated on the shell. Unlike the present invention, such a catalyst simply employs the metal catalyst material by disposing or coating the metal catalyst material on the shell instead (The catalyst in accordance with the present invention has the dual particle structure which comprises central core particles and outer particle layer for heat exchange). In the case of coating or soaking the surface with the catalytic material while employing the porous particles as a central core, as disclosed in KR Laid-Open Patent Publication No. 2007-0010190, the catalytic material moves to the core particles and catalytic reaction takes place, thereby causing poor controllability as compared to the catalyst of the present invention.

Thus, the catalyst having the dual particle structure in accordance with the present invention has excellent heat transfer capability allowing high selectivity to a target hydrocarbon, particularly in $C_{5+}$ selectivity, and hence can be useful in the Fischer-Tropsch synthesis for producing hydrocarbons from synthetic gas. Therefore, the catalyst of the present invention can be effectively used as a catalyst for fixed bed reactor in a regular fixed bed reactor (a shell and tube heat exchanger) as well as in a multi-channel reactor where reactions take place at a high space velocity.

Hereinafter, the present invention is described in more detail. The following Examples are given for the purpose of illustration only, and are not intended to limit the scope of the invention.

EXAMPLES

Figure 2:
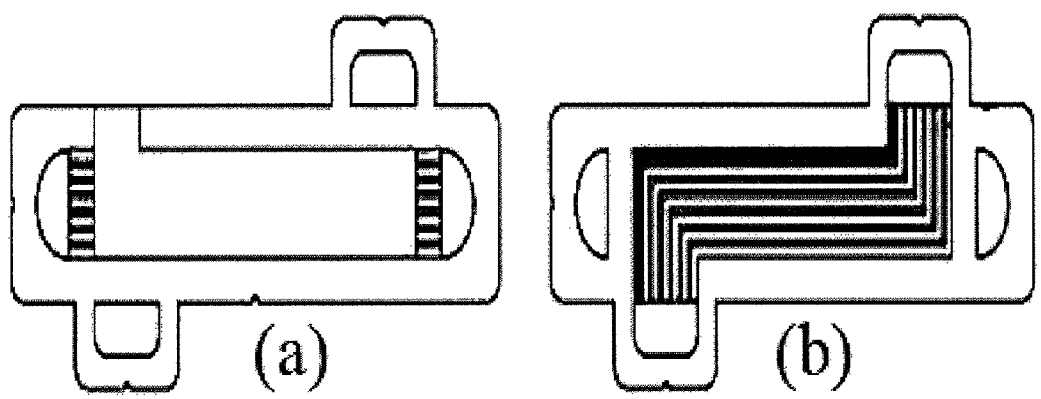
FIGS. 2A and 2B are schematic views of a multi-channel reactor equipped with a fixed-bed heat exchanger, showing a heat exchange portion where catalysts are loaded into the reactor, and heat exchanger plates which surround the front and rear parts of the heat exchange portion, respectively.

In order to test catalytic performances of the catalysts having the dual particle structure in accordance with the present invention, two different catalyst types were prepared separately. Then, the catalysts thus obtained were loaded into a multi-channel reactor to carry out the Fischer-Tropsch synthesis, and the reactor behavior was observed. A reactor equipped with a fixed-bed type heat exchanger, as shown in FIG. 2, was used as a multi-channel reactor in this experiment. In FIG. 2, (a) represents a heat exchange portion where catalysts are loaded into the reactor and (b) represents the heat exchanger plates which surround the front and rear parts of the heat exchange portion.

Example 1 and Comparative Example 1

Preparation of Catalysts 23 wt % of cobalt and 0.05 wt % of platinum were immersed in gamma-alumina powder having a diameter distribution of 50 to 120 μm, were dried at 110° C., and were sintered at 500° C. for 5 hours to obtain catalyst particles in a powder form wherein cobalt and platinum particles are supported on the gamma-alumina. A sufficient amount of the catalyst particles thus obtained were placed on a plate, and then a suitable amount of irregular-shaped alumina particles (HTM) having a size of about 1 mm coated with an adhesive boehmite sol were placed on the catalyst particles in the powder form. The plate was shaken so that the catalyst particles in the powder form adhere to the boehmite sol-coated HTM (central core particles) evenly. Then, the resulting particles were sintered at 400° C. for 1 hour to bind them so as to prevent them from being detached from one another. The resulting catalyst obtained was named "Catalyst A," and the schematic view illustrating the catalyst having the dual particle structure is shown in FIG. 1 (Example 1).

Meanwhile, 23 wt % of cobalt and 0.05% of platinum were immersed in a cylindrical gamma-alumina support, were dried at 110° C., and were sintered at 500° C. for 5 hours. The catalyst thus formed was pulverized to particles having a size of about 1 mm. The resulting catalyst obtained was named "Catalyst B" (Comparative Example 1).

Example 2

Fischer-Tropsch Synthesis Reaction Using Catalyst A 1 g of Catalyst A from Example 1 was loaded into a channel-type reactor (about 0.0001 barrels per day (BPD)) as illustrated in FIG. 2, and then Fischer-Tropsch synthesis was performed on synthetic gas. The volume of the inner space of the reactor where catalysts are loaded into the reactor was 2 cm$^3$, and the reactor was equipped with a fixed-bed heat exchanger on each side of the heat exchange portion. The catalyst was activated at about 400° C. using a mixed gas ($H_2$:He=5:95) for reduction before Fischer-Tropsch synthesis was performed. The reaction conditions were as follows:

Reaction temperature: 220° C.,
Pressure: 20 bar
Space velocity: 2,000 mL/g-catalyst/hr
Synthesis gas composition: H/CO/Ar=63/31.5/5.5 mol %,
wherein the ratio of hydrogen to carbon monoxide was approximately 2:1 in the composition, and the weight of the HTM was excluded when the space velocity was calculated.

As a result of the Fischer-Tropsch synthesis, the CO conversion rate was 18.63%; and methane selectivity and the $C_{5+}$ hydrocarbon selectivity were 10.19% and 87.32%, respectively.

Comparative Example 2

Fischer-Tropsch Synthesis Reaction Using Catalyst B

The procedures of Example 2 were repeated, except for using Catalyst B obtained in Example 1, to perform the Fischer-Tropsch synthesis on a synthetic gas.

As a result of the Fischer-Tropsch synthesis, the CO conversion rate was 13.04%; and methane selectivity and the $C_{5+}$ hydrocarbon selectivity were 12.85% and 83.06%, respectively.

As is apparent from the results of the synthesis reaction above, the CO conversion rate which indicates the degree of reaction, and the selectivity of $C_{5+}$ hydrocarbon were higher when Catalyst A having the dual particle structure in accordance with the present invention was used, as compared with the Catalyst B.

What is claimed is:

1. A catalyst for Fischer-Tropsch synthesis having a dual particle structure comprising:
   (1) central core particle or particles made of a heat transfer material (HTM) selected from the group consisting of a metal, a metal oxide, a ceramic and a mixture thereof; and
   (2) outer particle layer which surrounds the central core particles and is attached to the surfaces of the central core particles by a binder material layer wherein the binder material layer is sintered after being attached to the outer particle layer,
   wherein the outer particle layer is made of catalyst particles in a powder form which contain metal particles disposed on a support.

2. The catalyst of claim 1, wherein the HTM is selected from the group consisting of silicon carbide (SiC), alumina, alundum, silica, aluminum, stainless steel, copper and a mixture thereof.

3. The catalyst of claim 1, wherein the support is selected from the group consisting of alumina, silica, zirconia, titania and a mixture thereof.

4. The catalyst of claim 1, wherein the size of the support is in the range of from 10 to 200 μm.

5. The catalyst of claim 1, wherein the metal particles of the catalyst particles in the powder form are selected from the group consisting of Co, Fe, Ru, Re, Rh, Ni, Pd, Pt, Os, Ir, an alloy thereof and a mixture thereof.

6. The catalyst of claim 1, wherein the binder material layer is made of a ceramic material selected from the group consisting of silica, boehmite and a mixture thereof.

7. The catalyst of claim 6, wherein the binder material layer is formed by sintering a ceramic sol selected from the group consisting of a silica sol, a boehmite sol and a mixture thereof at a temperature in the range of from 400 to 500° C.

8. The catalyst of claim 1, wherein the binder material layer is made of an oxide material comprising Si, Al or a mixture thereof, and oxygen.

* * * * *